(12) United States Patent
Goto (10) Patent No.: US 11,997,571 B2
(45) Date of Patent: May 28, 2024

(54) VEHICLE WIRELESS COMMUNICATION DEVICE

(71) Applicant: DENSO CORPORATION, Kariya (JP)

(72) Inventor: Toshiyuki Goto, Kariya (JP)

(73) Assignee: DENSO CORPORATION, Kariya (JP)

( * ) Notice: Subject to any disclaimer, the term of this patent is extended or adjusted under 35 U.S.C. 154(b) by 368 days.

(21) Appl. No.: 17/409,327

(22) Filed: Aug. 23, 2021

(65) Prior Publication Data

US 2021/0385628 A1    Dec. 9, 2021

Related U.S. Application Data

(63) Continuation of application No. PCT/JP2020/007366, filed on Feb. 25, 2020.

(30) Foreign Application Priority Data

Feb. 28, 2019  (JP) ................................. 2019-036154

(51) Int. Cl.
*H04W 4/38* (2018.01)
*G06F 1/20* (2006.01)
*H04W 4/40* (2018.01)

(52) U.S. Cl.
CPC ................ *H04W 4/38* (2018.02); *G06F 1/20* (2013.01); *H04W 4/40* (2018.02)

(58) Field of Classification Search
CPC .. H04W 4/38; H04W 4/40; G06F 1/20; G06F 1/206; Y02D 30/70; H04B 1/036; H04B 1/082; H04B 1/38
See application file for complete search history.

(56) References Cited

U.S. PATENT DOCUMENTS

| | | | |
|---|---|---|---|
| 6,188,913 B1* | 2/2001 | Fukagawa | H01Q 21/29 342/359 |
| 2003/0038719 A1* | 2/2003 | Mattes | B60N 2/002 340/541 |
| 2015/0065067 A1* | 3/2015 | Sugimoto | H04W 52/242 455/90.1 |
| 2018/0292521 A1* | 10/2018 | Saitou | G01V 3/12 |
| 2020/0174052 A1* | 6/2020 | Homma | H01Q 3/267 |

FOREIGN PATENT DOCUMENTS

| | | |
|---|---|---|
| JP | 2004-032156 A | 1/2004 |
| JP | 6160246 B2 | 7/2017 |
| WO | WO-2014192261 A1 | 12/2014 |

\* cited by examiner

*Primary Examiner* — Dady Chery
(74) *Attorney, Agent, or Firm* — Harness, Dickey & Pierce, P.L.C.

(57) ABSTRACT

A vehicle wireless communication device includes: an electric wave transmission portion that has a function of transmitting an electric wave; an electric wave reception portion that has a function of receiving an electric wave; a positioning portion that has a positioning function; a temperature acquisition portion that acquires a temperature of the vehicle wireless communication device; and a function controller that represses multiple functions or restitutes a repressed function.

9 Claims, 5 Drawing Sheets

| ITEMS OF STOP FUNCTION/ REDUCTION FUNCTION | POINTER p |
|---|---|
| DSRC TRANSMISSION DIVERSITY FUNCTION STOP | 0 |
| TRANSMISSION Duty REDUCTION, TRANSMISSION POWER REDUCTION | 1 |
| DSRC TRANSMISSION FUNCTION STOP | 2 |
| DSRC RECEPTION DIVERSITY FUNCTION STOP | 3 |
| DSRC RECEPTION PROCESS STOP, POSITIONING FUNCTION STOP | 4 |
| CAN COMMUNICATION FUNCTION STOP | 5 |

HIGH PRIORITY ↑↓ LOW PRIORITY

VEHICLE WIRELESS COMMUNICATION DEVICE

CROSS REFERENCE TO RELATED APPLICATIONS

The present application is a continuation application of International Patent Application No. PCT/JP2020/007366 filed on Feb. 25, 2020, which designated the U.S. and claims the benefit of priority from Japanese Patent Application No. 2019-036154 filed on Feb. 28, 2019. The entire disclosures of all of the above applications are incorporated herein by reference.

TECHNICAL FIELD

The present disclosure relates to a vehicle wireless communication device that communicates with the outside of a vehicle.

BACKGROUND

In a comparative example, a vehicle wireless communication device controls a transmission electric power during communication in accordance with a temperature and the amount of sunshine.

SUMMARY

A vehicle wireless communication device includes: an electric wave transmission portion that has a function of transmitting an electric wave; an electric wave reception portion that has a function of receiving an electric wave; a positioning portion that has a positioning function; a temperature acquisition portion that acquires a temperature of the vehicle wireless communication device; and a function controller that represses multiple functions or restitutes a repressed function.

BRIEF DESCRIPTION OF DRAWINGS

The above and other features and advantages of the present disclosure will be more clearly understood from the following detailed description with reference to the accompanying drawings. In the accompanying drawings.

DETAILED DESCRIPTION

In recent years, there has been a demand for miniaturization and weight reduction of the vehicle wireless communication device. Further, the number of functions of the vehicle wireless communication device is increasing, and a power consumption is increasing. As a result of detailed examination by the inventor, in view of such circumstances, a temperature of the vehicle wireless communication device may not be sufficiently managed by only the repression of the transmission electric power.

One example embodiment of the present disclosure provides a technology capable of satisfactorily managing a temperature of a vehicle wireless communication device that communicates with the outside of a vehicle.

According to one example, a vehicle wireless communication device is mounted on a vehicle and communicates with an outside of a vehicle. The vehicle wireless communication device includes: an electric wave transmission portion, an electric wave reception portion, a positioning portion, a temperature acquisition portion, and a function controller.

The electric wave transmission portion has a function of transmitting an electric wave. The electric wave reception portion has a function of receiving an electric wave. The positioning portion has a positioning function. The temperature acquisition portion acquires a temperature of the vehicle wireless communication device. The function controller represses multiple functions among the function of transmitting the electric wave, the function of receiving the electric wave, and the positioning function, or restitutes a repressed function, according to the temperature.

According to such a configuration, it is possible to repress not only the function of transmitting the electric waves but also the function of receiving the electric waves or the positioning function, or restitute the repressed function, in accordance with the temperature. In such a manner, by repressing multiple functions or restituting the function, it is possible to control the amount of heat generation due to increase or decrease in the power consumption of the vehicle wireless communication device. Therefore, it is possible to satisfactorily manage the temperature of the vehicle wireless communication device.

Hereinafter, one embodiment of the present disclosure will be described with reference to the drawings.

1. Embodiment

[1-1. Configuration]

A vehicle wireless communication device 1 of the present disclosure is mounted on a vehicle such as a passenger vehicle, and communicates with the outside of the vehicle. For example, the vehicle wireless communication device 1 communicates with a device outside the vehicle. In particular, the vehicle wireless communication device 1 is used when a V2X (vehicle to X) service for communication with some device inside or outside the vehicle is performed.

The vehicle wireless communication device 1 has a function of transmitting electric waves, a function of receiving electric waves, a function of communication inside the vehicle, and a positioning function. The vehicle wireless communication device 1 is configured as, for example, one module component, and the size and the weight are reduced.

When the vehicle wireless communication device 1 is made smaller and lighter, a surface area tends to be smaller and it tends to be difficult to dissipate heat. Generally, it becomes difficult to manage the temperature. However, in a case of the vehicle wireless communication device 1 of the present embodiment, it is possible to secure the functions of the vehicle wireless communication device 1 as long as possible by monitoring the temperature and sequentially repressing or restituting multiple functions of the vehicle wireless communication device 1. One example of the specific configuration of the vehicle wireless communication device 1 will be described as below.

Figure 1:
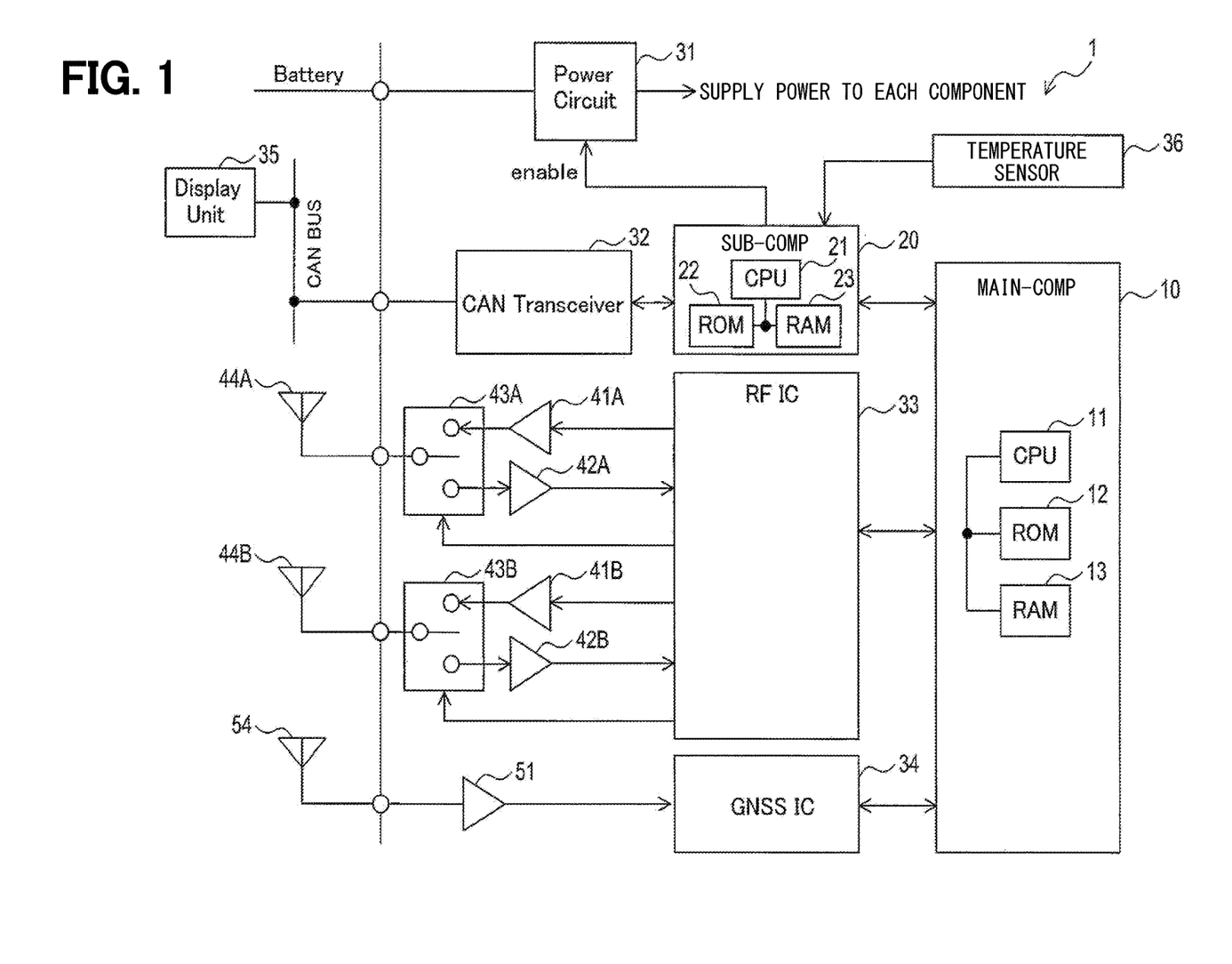
FIG. 1 is a block diagram showing a configuration of a communication system.

The vehicle wireless communication device 1 shown in FIG. 1 includes a main microcomputer 10, a RFIC 33, and a GNSSIC 34. The main microcomputer 10 may correspond to a computer. Further, the vehicle wireless communication device 1 may include a sub-microcomputer 20, a power source circuit 31, a CAN (registered trademark, Controller Area Network) transceiver 32, a temperature sensor 36, multiple power amplifiers 41A and 41B. The sub-microcomputer 20 may correspond to a computer. Further, the vehicle wireless communication device 1 may include low noise amplifiers 42A, 42B, and 51, and multiple switches 43A and 43B. In the drawings, the main microcomputer 10 may be also referred to as MAIN-COMP, and the sub-microcomputer 20 may be also referred to as SUB-COMP.

The power source circuit 31 is a circuit that supplies electric power to each component configuring the vehicle wireless communication device 1. For example, when the sub-microcomputer 20 is activated, the power source circuit 31 receives a signal indicating that the sub-microcomputer 20 is activated, and starts supplying an electric power.

The CAN transceiver 32 is a transceiver that communicates with other communication devices in the vehicle via a communication line of an in-vehicle LAN. The CAN transceiver 32 can communicate with a display unit 35 as one of the other communication devices. When receiving, from the vehicle wireless communication device 1, an instruction for performing a caution display that displays a display image related to a warning, the display unit 35 performs the caution display. When receiving an instruction for stopping the caution display, the display unit 35 ends the caution display.

The RFIC 33 is an abbreviation for Radio Frequency Integrated Circuit, and is an integrated circuit that processes a signal of a RF band. The RFIC 33 has a function of transmitting electromagnetic waves (also referred to as electric waves or radio waves) and a function of receiving electric waves.

Specifically, the RFIC 33 has a diversity function of, by using multiple systems, transmitting and receiving electric waves adapted to a DSRC-V2X (registered trademark) that is an abbreviation for Dedicated Short Range Communications Vehicle to Everything, or a C-V2X that is an abbreviation for CELLULAR-V2X That is, the RFIC 33 outputs signals to be transmitted to two power amplifiers 41A and 41B, the two power amplifiers 41A and 41B amplify the signals, and each of two antennas 44A and 44B emits the electric waves.

Further, the electric waves received by the two antennas 44A and 44B are amplified respectively by the two low noise amplifiers 42A and 42B and transmitted to the RFIC 33. The low noise amplifiers 42A and 42B have a function of amplifying the signals, and a function as a filter for removing noise.

Further, the multiple switches 43A and 43B switch contact points to connect two antennas 44A and 44B to the power amplifiers 41A and 41B or the low noise amplifiers 42A and 42B. That is, the use of each of two antennas 44A and 44B can be switched to the use for transmitting the electric waves or the use for receiving the electric waves by switching of the contact point at the multiple switches 43A and 43B.

The GNSSIC 34 has a positioning function based on a signal from an artificial satellite. In the vehicle wireless communication device 1, a signal obtained by a GNSS (Global Navigation Satellite System) antenna 54 is amplified by the low noise amplifier 51, and input to the GNSSIC 34. The GNSSIC 34 calculates a current location of the vehicle by processing the signal, and outputs the result to the main microcomputer 10.

The temperature sensor 36 is placed adjacent to the main microcomputer 10 having a relatively large among of heat generation, the heat amount being larger than that of components in the vehicle wireless communication device 1. The temperature sensor 36 may be placed in the vicinity of a component that is different from the main microcomputer 10 and has a relatively large amount of the heat generation. A detection result by the temperature sensor 36 is input to the main microcomputer 10 via the sub-microcomputer 20.

The main microcomputer 10 includes a microcomputer having a CPU 11 and a semiconductor memory such as, for example, a ROM 12 and a RAM 13. The sub-microcomputer 20 includes a microcomputer having a CPU 21 and a semiconductor memory such as, for example, a ROM 22 and a RAM 23. Functions of the main microcomputer 10 and the sub-microcomputer 20 is implemented by the CPUs 11 and 21 executing programs stored in a non-transitory tangible storage medium. In this example, the semiconductor memory corresponds to the non-transitory tangible storage medium storing a program. Further, by executing this program, a method corresponding to the program is executed. The non-transitory tangible storage medium means a storage medium excluding electromagnetic waves. Further, the main microcomputer 10 and the sub-microcomputer 20 main include one microcomputer or multiple microcomputers.

The main microcomputer 10 is programmed to execute a temperature protection process described later. The sub-microcomputer 20 has a function of relaying data between the temperature sensor 36 and the CAN transceiver 32, and the main microcomputer 10. Further, the sub-microcomputer 20 may be configured so as to complement a part of the functions of the main microcomputer 10 and the functions of the main microcomputer 10.

The method of implementing the functions of the respective units included in the main microcomputer 10 and the sub-microcomputer 20 is not limited to software, and a part or all of the functions thereof may be implemented by using one or multiple hardware circuits. For example, when the above-described functions may be implemented by an electronic circuit which is hardware, the electronic circuit may be implemented by a digital circuit, an analog circuit, or a combination thereof.

[1-2. Process]

Next, the temperature protection process executed by the main microcomputer 10, particularly, the CPU 11 will be described with reference to flowcharts of FIG. 2 and FIG. 4. The temperature protection process is a process of repressing multiple functions of the vehicle wireless communication device 1 or restituting the repressed function, in accordance with the temperature. The temperature protection process starts, for example, when a power source of the vehicle is turned on. An initial value of a pointer p described later is set to 0.

In the temperature protection process, first, in S110, the main microcomputer 10 acquires a temperature of the vehicle wireless communication device 1 detected by the temperature sensor 36, and determines whether the temperature satisfies a condition A. Here, the condition A is a condition for repressing the function. Specifically, the condition A indicates that the temperature is equal to or higher than a preset repression threshold Vthh and also a change rate of the temperature is positive.

The positive change rate of the temperature indicates that the temperature is rising. The temperature acquired by the temperature sensor 36 is temporarily stored in the RAM 13. The change rate of the temperature is calculated by dividing a difference between a temperature acquired in the past and a latest temperature by a time interval between time points of these detected temperatures.

In S110, when the main microcomputer 10 determines that the temperature does not satisfy the condition A, and the process shifts to S210 described later. On the other hand, when the main microcomputer 10 determines that the temperature satisfies the condition A in S110, the process shifts to S120. The main microcomputer 10 determines whether a value of the pointer p is equal to or less than a Pmax. Here, the pointer p is a value for identifying an operating function or the repressed function among multiple functions of the vehicle wireless communication device 1.

Figure 3:
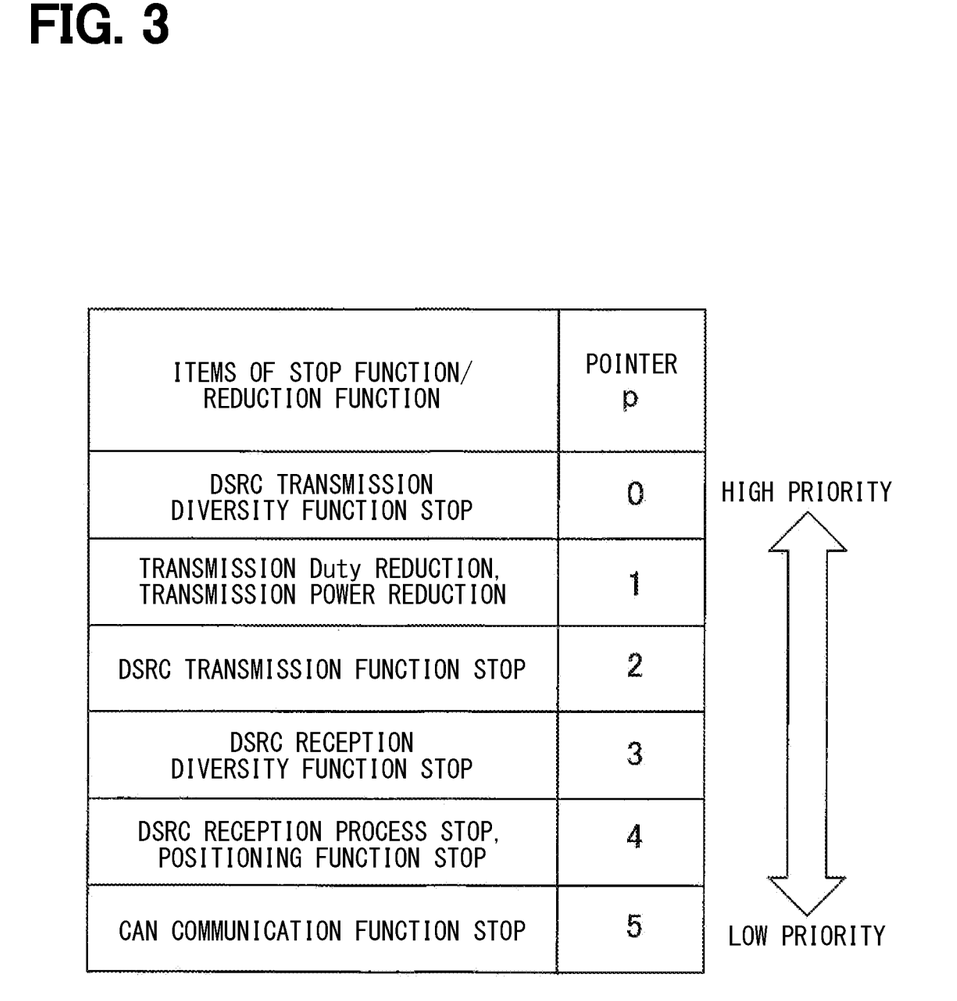
FIG. 3 is a list showing one example of a task stop order.

The values of the pointer p and the multiple functions are associated with each other in a task stop order as shown in FIG. 3, for example. That is, the value equal to 0 (p=0) is associated with "DSRC transmission diversity function stop". The "DSRC transmission diversity function stop" means that, when the electric waves are transmitted by the DSRC, the function of transmitting the electric waves from the two antennas 44A and 44B is repressed and one of the two antennas 44A and 44B transmits the electric wave.

By such a diversity function stop, a circuit block implementing the transmission diversity function inside the RFIC 33 or an operation of a software process is stopped, and further operation of one of the power amplifiers 41A and 41B is stopped. As a result, a communication area is narrowed. However, the operation of transmission function continues.

Further, the value equal to 1 (p=1) is associated with "transmission duty reduction and transmission electric power reduction". The "transmission duty reduction and the transmission electric power reduction" means to, when the electric wave is transmitted by the DSRC, reduce the duty ratio of the transmission wave or the transmission electric power.

Further, the value equal to 2 (p=2) is associated with "DSRC transmission function stop". The "DSRC transmission function stop" means to stop the electric wave transmission by the DSRC.

Further, the value equal to 3 (p=3) is associated with a "DSRC reception diversity function stop". The "DSRC reception diversity function stop" means to, when the electric waves are received by the DSRC, repress the function of receiving the electric waves from the two antennas 44A and 44B, amplify one of the electric waves received by the two antennas 44A and 44B, and process the signal.

In order to repress the function of receiving the electric waves, not only the DSRC reception diversity function stop but also reduction in a reception sensitivity, reduction in a communication area, reduction in the number of communicable vehicles, reduction in the number of reception packets per unit time, and the like may be employed.

Further, the value equal to 4 (p=4) is associated with "DSRC reception process stop and positioning function stop". The "DSRC reception process and positioning function stop" means to stop the function of receiving information by the DSRC and the positioning function using the GNSSIC 34. In particular, when the positioning function is stopped, the positioning process executed inside the main microcomputer 10 is stopped and the power source of the GNSSIC 34 may be turn off.

Further, the value equal to 5 (p=5) is associated with a "CAN communication function stop". The "CAN communication function stop" means to stop an inter-vehicle communication using the CAN transceiver 32. Then, the power source of the CAN transceiver 32 is turned off, and the function related to CAN transmission and CAN reception of each of the main microcomputer 10 and the sub-microcomputer 20 are stopped.

The Pmax is a maximum value of the pointer p in the task stop order list. In a case of the present embodiment, the Pmax is 5. When the value of the pointer p becomes large, all functions corresponding to values equal to or lower than the pointer p are stopped. For example, in a case where the value is equal to 2 (p=2), not only the "DSRC transmission function stop" corresponding to the value equal to 2 (p=2) but also the "transmission duty reduction and the transmission electric power reduction" corresponding to the value equal to 1 (p=1) and the "DSRC transmission diversity function stop" corresponding to the value equal to 0 (p=0) are executed.

Here, the prioritized order of the task stop order list shown in FIG. 3 is set based on the following design concept.

[1] Set the operation of the CAN function to the highest priority. This is because, when the CAN function is stopped, another communication device that communicates with the vehicle wireless communication device 1 detects an abnormality and a communication interruption diagnosis remains.

[2] Set the operation of the positioning function to the second priority. This is because the V2X service can be provided when the positioning function is activated.

[3] Set the reception function to the third priority and set the transmission function to the fourth priority. This is because a possibility of transmitting abnormal data when the temperature is high. Further, this is because the priority of the transmission function is set to be lower than that of the reception function in order to stop the function of transmitting the abnormal data at an earlier stage.

That is, the main microcomputer 10 represses the functions in the order of the function of transmitting the electric waves, the function of receiving the electric waves, and the positioning function.

Figure 2:
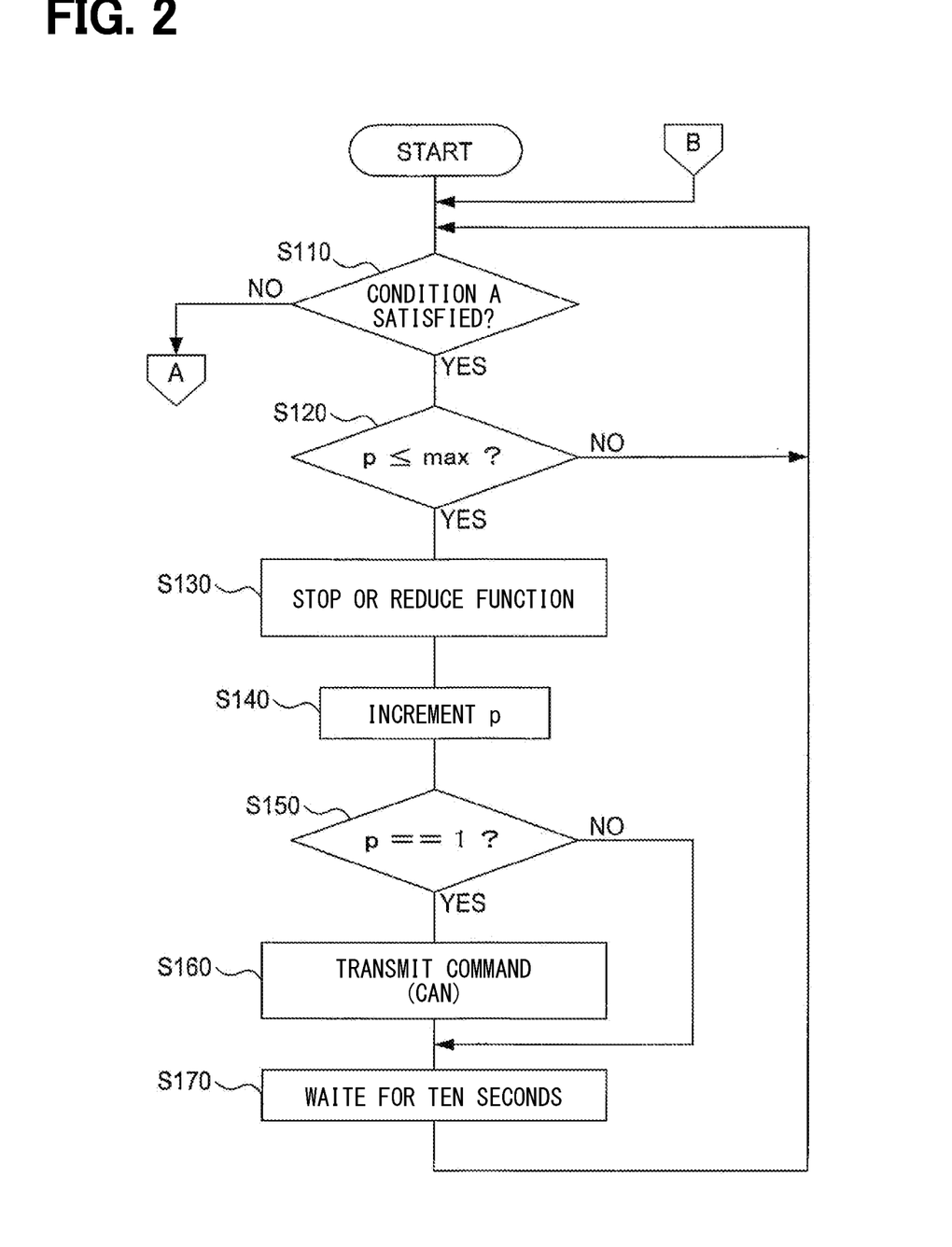
FIG. 2 is a flowchart showing a part of a temperature protection process.

Returning to the description of FIG. 2, when the main microcomputer 10 determines that the value of the pointer p is higher than the Pmax in S120, the process returns to S110 since there is no further function that can be repressed. On the other hand, when the main microcomputer 10 determines that the value of the pointer p is equal to or less than that the Pmax in S120, the process shifts to S130. The function indicated by the pointer p of the task stop order list is stopped or reduced.

By the execution of the process in S130 multiple times, the main microcomputer 10 sequentially represses, in accordance with the temperature, multiple functions of the function of transmitting the electric waves, the function of receiving the electric waves, and the positioning function. However, when the temperature becomes less than a repression threshold Vthh or the change rate of the temperature becomes non-positive, the main microcomputer 10 does not further repress the function.

That is, the main microcomputer 10 continues the repressed state of the function that has been already repressed and does not repress the new function, when the temperature becomes less than the repression threshold Vthh or the temperature does not rise after repressing one function.

Next, in S140, the main microcomputer 10 increments the value of the pointer p. Next, in S150, the main microcomputer 10 determines whether the value of the pointer p is 1. When the main microcomputer 10 determines that the value of the pointer p is not 1 in S150, the process shifts to S170.

On the other hand, when the main microcomputer 10 determines than the value of the pointer p is 1 in S150, the process shifts to S160. The main microcomputer 10 transmit s a caution display start command to the display unit 35. That is, when any one of the multiple functions is repressed, the main microcomputer 10 provides notification by the caution display to an occupant of the vehicle. The caution display is display using characters or images for warning that any of functions related to the communication is repressed. However, the main microcomputer 10 may provide the notification by not only the display but also a warning sound or a voice. Further, the main microcomputer 10 may display a message urging an operation of lowering a vehicle interior temperature when performing the caution display.

In such a manner, by notifying the occupant of the vehicle that the function is repressed, it is possible to urge the occupant of the vehicle to perform an operation of lowering the vehicle interior temperature such as, for example, turning on an air-conditioner or opening a window. In this case, since it is possible to lower the temperature of the vehicle wireless communication device 1 faster, it is possible to normally restitute the function of the vehicle wireless communication device 1 faster. Further, when various functions of the vehicle wireless communication device 1 are not operating, notification about the situation is provided to the vehicle occupant. Therefore, it is possible to urge the vehicle occupant to perform a driving operation with a feeling of the same tension as a tension in a state where the vehicle does not have various functions of the vehicle wireless communication device 1.

When various functions of the vehicle wireless communication device 1 are repressed and the notification about the situation is not provided to the vehicle occupant, there is a possibility that the vehicle occupant mistakenly thinks that the vehicle is malfunctioned and requests a car dealer or the like to repair the vehicle. According to the configuration of the present embodiment, it is possible to avoid various failures caused when such a notification is not provided.

Next, after the main microcomputer 10 waits for 10 seconds in S170, the process returns to S110. That is, the main microcomputer 10 waits for a preset predetermined time so that, immediately after one function is repressed, another function is not repressed. Thereafter, the main microcomputer 10 represses another function if necessary.

Figure 4:
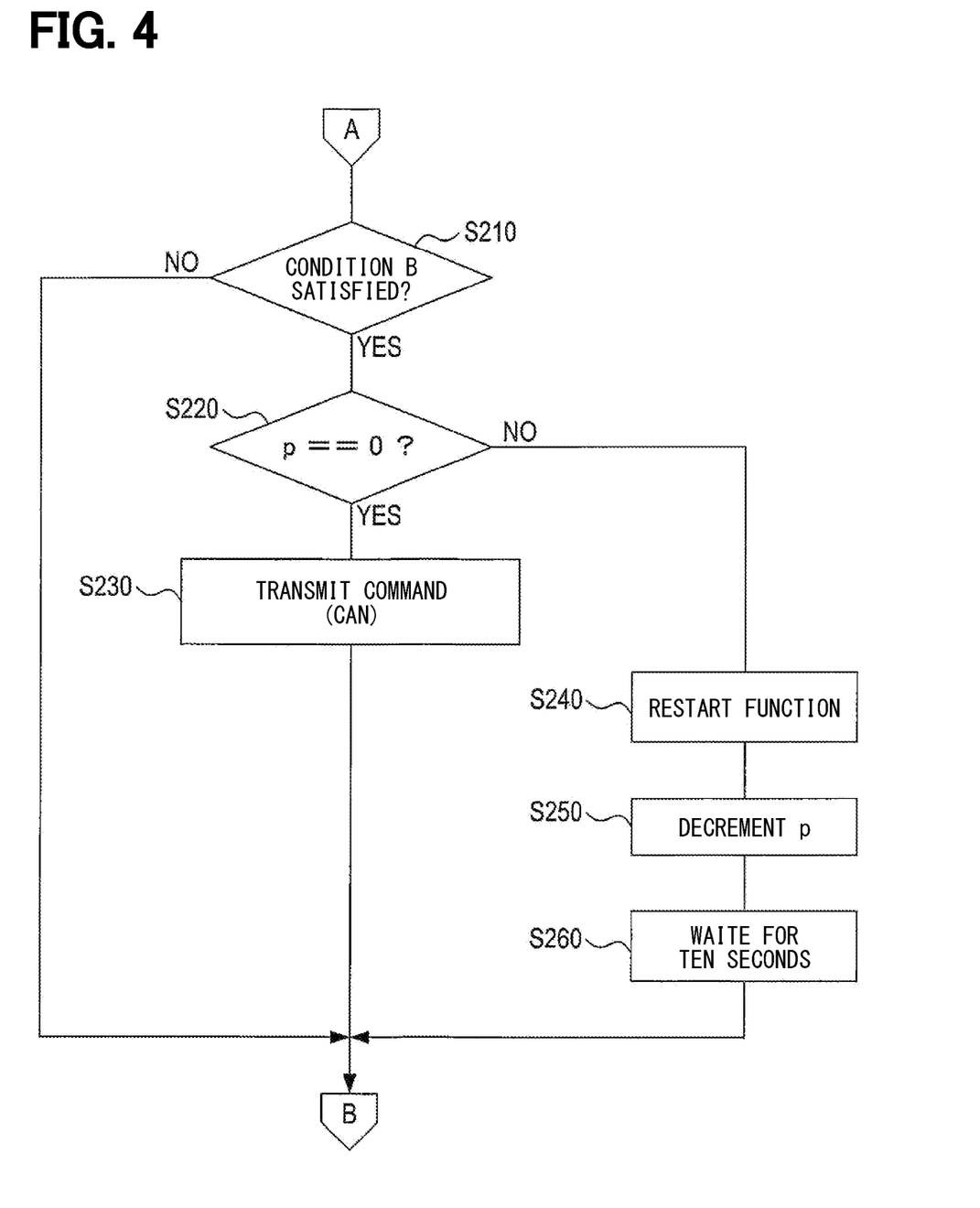
FIG. 4 is a flowchart showing a different part of the temperature protection process.

Next, as shown in FIG. 4, in S210, the main microcomputer 10 determines whether the temperature satisfies a condition B. Here, the condition B is a condition for restituting the repressed function. Specifically, the condition B indicates that the temperature is less than a preset restitution threshold Vthl and also the change rate of the temperature is negative. The negative change rate of the temperature indicates that the temperature is decreasing.

The restitution threshold Vthl may be set to a value same as the repression threshold Vthh described above. However, in the present embodiment, the restitution threshold Vthl is set to a temperature lower than the repression threshold Vthh. In other words, in the present embodiment, the restitution threshold Vthl and the repression threshold Vthh that are multiple thresholds are provided with hysteresis. The thresholds are provided with the hysteresis in order to prevent a function from being restituted immediately after the function is repressed, or prevent the function from being repressed immediately after the function is restituted.

When determining that the temperature does not satisfy the condition B in S210, the main microcomputer 10 does not restitute the repressed function. In this case, the process returns to S110. On the other hand, the main microcomputer 10 determines that the temperature satisfies the condition B in S210, the process shifts to S220. The main microcomputer 10 determines whether the value of the pointer p is 0.

When the main microcomputer 10 determines that the value of the pointer p is 0 in S220, the process shifts to S230. The main microcomputer 10 transmits the caution display stop command to the display unit 35. Then, the main microcomputer 10 restarts, in other words, restitutes the "DSRC transmission diversity function" corresponding to the value equal to 0 (p=0). Thereafter, the present process returns to S110. When the caution display stop command is transmitted, the display unit 35 ends the caution display, and the display related to the warning is turned off.

On the other hand, when the main microcomputer 10 determines that the value of the pointer p is not 0 in S220, the process shifts to S240. The main microcomputer 10 restarts the function indicated by a pointer p-1 of the task stop order list. When the process in S220 is repeatedly executed, the main microcomputer 10 restitutes, in accordance with the temperature, the positioning function, the function of receiving the electric waves, and the function of transmitting the electric waves in the order.

Next, in S250, the main microcomputer 10 decrements the pointer p. Next, in S260, the main microcomputer 10 waits for 10 seconds, and the process returns to S110. That is, the main microcomputer 10 waits for a preset predetermined time each time one function is restituted. Thereafter, the main microcomputer 10 restitutes another function.

[1-3. Operation Example]

Figure 5:
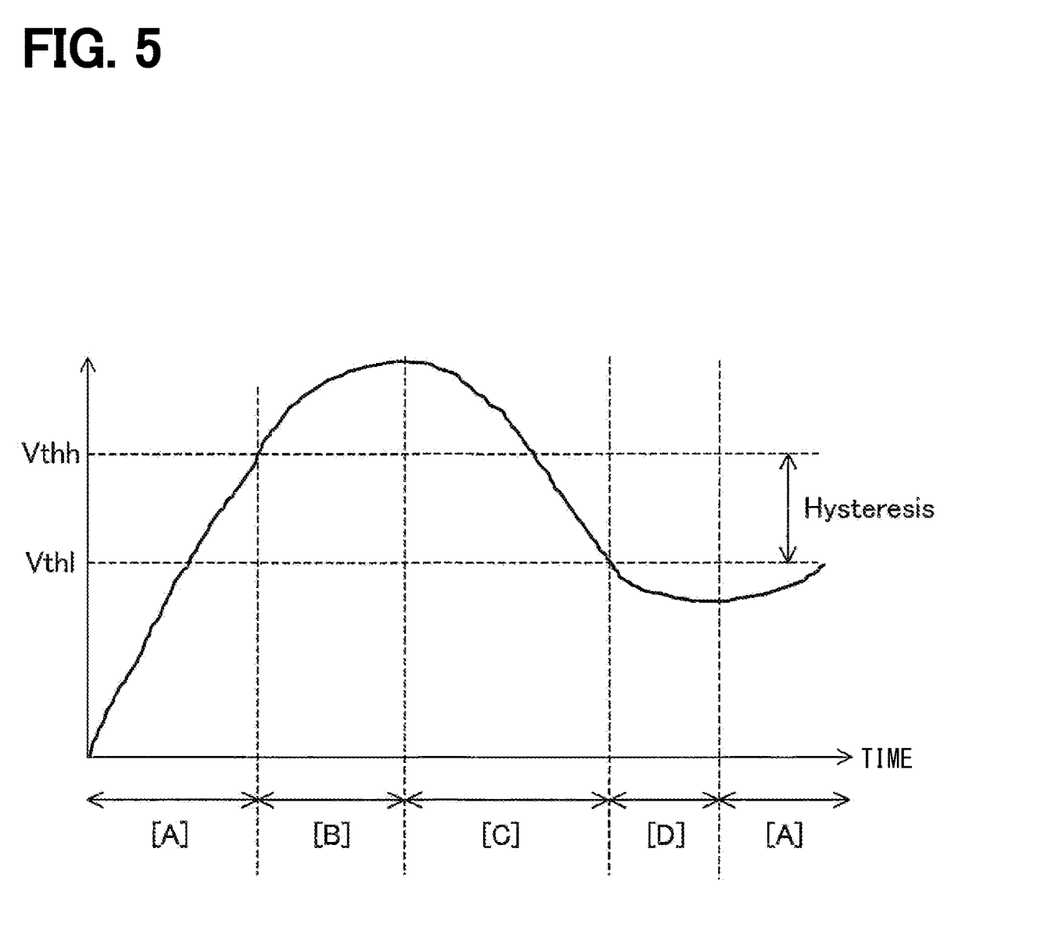
FIG. 5 is a graph showing one example of a relationship between a temperature change and a threshold.

An operation example of the vehicle wireless communication device 1 will be described with reference to a graph shown in FIG. 5. In the graph shown in FIG. 5, the vertical axis shows the temperature by the temperature sensor 36 and the horizontal axis shows the time. The left end of the graph indicates that the time is zero. When the time is 0, the vehicle wireless communication device 1 starts the operation.

In a time zone of [A] in the graph, the temperature is rising, and the temperature is lower than the repression threshold Vthh. In the time zone of [A], since, in the processes of S110 and S210, the determination of the main microcomputer 10 is negative, the main microcomputer 10 does not repress the function and does not restitute the function.

Next, in a time zone of [B] in the graph, it is shown that the temperature is higher than the repression threshold Vthh and is raising (the change rate of the temperature is positive). In the time zone of [B], since, in the processes of S110 and S120, the determination of the main microcomputer 10 is positive, the main microcomputer 10 represses the functions in ascending order of priority in the process of S130.

Next, in a time zone of [C] in the graph, it is shown that the temperature is higher than the restitution threshold Vthl and is decreasing (the change rate of the temperature is negative). In the time zone of [C], since, in the processes of S110 and S210, the determination of the main microcomputer 10 is negative, the main microcomputer 10 does not repress the function and restitute the function.

Next, in a time zone of [D] in the graph, it is shown that the temperature is lower than the restitution threshold Vthl and is decreasing. In the time zone of [D], since, in the process of S210, the determination of the main microcomputer 10 is positive, the main microcomputer 10 restitutes the functions in descending order of priority in the process of S240.

[1-4. Effects]

According to the embodiment described in detail above, the following effects are obtained.

(1a) One example embodiment is the vehicle wireless communication device 1 that is mounted on the vehicle and communicates with the outside of the vehicle. The vehicle wireless communication device 1 includes the main microcomputer 10, the RFIC 33, and the GNSSIC 34.

The RFIC 33 has the function of transmitting electric waves (also referred to as radio waves) and the function of receiving electric waves. The GNSSIC 34 has the positioning function. In S110, the main microcomputer 10 acquires the temperature of the vehicle wireless communication device 1. In S130 and S240, in accordance with the temperature, the main microcomputer 10 represses the multiple functions among the function of transmitting the electric waves, the function of receiving the electric waves, and the positioning function, or restitutes the repressed function.

According to such a configuration, it is possible to repress not only the function of transmitting the electric waves but also the function of receiving electric waves or the positioning function, or restitute the repressed function, in accordance with the temperature. In such a manner, by repressing multiple functions or restituting the function, it is possible to control the amount of heat generation generated by increase or decrease in the power consumption of the vehicle wireless communication device 1. Therefore, it is possible to satisfactorily manage the temperature of the vehicle wireless communication device 1.

(1b) According to one example embodiment, in S130, the main microcomputer 10 represses multiple functions in accordance with the temperature. Further, in S130, the main microcomputer 10 sequentially represses multiple functions, and then, waits for the preset predetermined time each time one function is repressed. Thereafter, the main microcomputer 10 represses another function.

According to such a configuration, when repressing multiple functions, it is possible to repress the functions with a time difference (time interval) without simultaneously repressing multiple functions. Accordingly, after the effect due to repression of one function is confirmed, it is possible to set whether to repress another function.

(1c) According to one example embodiment, in S130, the main microcomputer 10 represses the functions in the order of the function of transmitting the electric waves, the function of receiving the electric waves, and the positioning function.

According to such a configuration, it is possible to repress the functions in ascending order of influence on the control of the entire vehicle.

(1d) According to one example embodiment, in S240, the main microcomputer 10 restitutes multiple functions in accordance with the temperature. Further, in S240, the main microcomputer 10 sequentially restitutes multiple functions, and then, waits for the preset predetermined time each time one function is restituted. Thereafter, the main microcomputer 10 restitutes another function.

According to such a configuration, when restituting multiple functions, it is possible to restitute the functions with a time difference (time interval) without simultaneously restituting multiple functions. Therefore, after the influence due to restitution of one function is confirmed, it is possible to set whether to restitute another function.

(1e) According to one example embodiment, in S160, the main microcomputer 10 provides notification to the vehicle occupant when the multiple functions are repressed. According to such a configuration, it is possible to provide the notification to the vehicle occupant when the function is restricted. There is a possibility that the vehicle occupant feels uncomfortable with an operation with the restricted function when recognizing a difference between the operation of each function with the restricted function and an operation of each function with no restricted function. However, in the present configuration, when the function is restricted, the notification is provided to the vehicle occupant. Therefore, the vehicle occupant can recognize that the function is restricted. Accordingly, it is possible to prevent the vehicle occupant from feeling uncomfortable.

(1f) According to one example embodiment, when, in S130 and S240, the temperature is equal to or higher than the preset repression threshold Vthh and also the change rate of the temperature is positive, the main microcomputer 10 represses multiple functions. Further, when the temperature is less than the repression threshold Vthh or the change rate of the temperature is not positive, the main microcomputer 10 does not repress multiple functions.

According to such a configuration, only when the temperature is equal to or higher than the repression threshold and also the temperature continues to rise, it is possible to repress multiple functions.

(1g) According to one example embodiment, when, in S240, the temperature is less than the preset restitution threshold Vthl and also the change rate of the temperature is negative, the main microcomputer 10 restitutes multiple repressed functions. Further, when the temperature is equal to or higher than the restitution threshold Vthl or the change rate of the temperature is not negative, the main microcomputer 10 does not institute multiple repressed functions.

According to such a configuration, only when the temperature is less than the threshold and also the temperature continues to decrease, it is possible to restitute multiple functions.

(1) According to one example embodiment, the repression threshold Vthh is set to a temperature higher than the restitution threshold Vthl.

According to such a configuration, since the repression threshold Vthh is set to the temperature higher than the restitution threshold Vthl, it is not possible to restitute the function until the temperature reaches the lower restitution threshold Vthl when the temperature reaches the repression threshold Vthh and the function is repressed. Accordingly, it is possible to prevent an operation, in which the function is repressed and restituted, from being frequently repeated.

2. Other Embodiments

Although the embodiment of the present disclosure has been described above, the present disclosure is not limited to the above-described embodiment, and it is possible to implement various modifications.

(2a) In the embodiment described above, the functions are repressed or restituted one by one. However, it is not limited to this. For example, when the absolute value of the change rate of the temperature is higher than a preset change rate, that is, when the temperature is rapidly changing, the main microcomputer 10 may not repress or institute the functions one by one, and may simultaneously repress or restitute multiple functions. In such a manner, when the temperature is rapidly rising, it is possible to repress the further rise in the temperature.

(2b) Multiple functions of one element in the above embodiment may be implemented by multiple elements, or one function of one element may be implemented by multiple elements. Further, multiple functions of multiple elements may be implemented by one element, or one function implemented by multiple elements may be implemented by one element. In addition, a part of the configuration of the above embodiment may be omitted. At least a part of the configuration of the above embodiment may be added to or substituted for the configuration of the other above embodiment.

(2c) The present disclosure can be implemented by, in addition to the vehicle wireless communication device 1 described above, various forms such as a system including the vehicle wireless communication device 1 as a configuration element, a program causing a computer to function as the vehicle wireless communication device 1, a non-transitory tangible storage medium such as a semiconductor memory storing this program, and a protection method of the vehicle wireless communication device 1.

3. Correspondence Relation Between Configuration of Described Above Embodiment and Configuration of Present Disclosure In the present embodiment, the RFIC 33 corresponds to an electric wave transmission portion and an electric wave reception portion in the present disclosure, and the GNSSIC 34 corresponds to a positioning portion in the present disclosure. Further, the process of S110 among the processes executed by the main microcomputer 10 corresponds to a temperature acquisition portion in the present disclosure. The processes in S130 and S240 correspond to a function controller in the present disclosure. The process in S160 corresponds to a notification portion in the present disclosure.

The invention claimed is:

1. A vehicle wireless communication device that is mounted on a vehicle and configured to communicate with a device outside of the vehicle, the vehicle wireless communication device comprising:
    a transmission portion that transmits radio waves;
    a reception portion that receives radio waves;
    a positioning portion that performs a positioning function to determine a position of the vehicle based on signals received from a global navigation satellite system (GNSS);
    a temperature acquisition portion configured to acquire a temperature of the vehicle wireless communication device; and
    a function controller configured to:
        determine whether the temperature of the vehicle wireless communication device is greater than a repression threshold and whether a change rate of the temperature of the vehicle wireless communication device is positive;
        in response to determining that the temperature of the vehicle wireless communication device is greater than the repression threshold and that the change rate of the temperature of the vehicle wireless communication device is positive, (1) repress the transmission of radio waves by the transmission portion, or the reception of radio waves by the reception portion, and (2) repress the positioning function by the positioning portion; and
        in response to determining that the temperature of the vehicle wireless communication device is not greater than the repression threshold or that the change rate of the temperature of the vehicle wireless communication device is not positive, restitute a repressed function.

2. The vehicle wireless communication device according to claim 1, wherein:
    the function controller is configured to repress a plurality of functions including the transmission of radio waves by the transmission portion and the reception of radio waves by the reception portion according to the temperature;
    the function controller is configured to sequentially repress the plurality of functions;
    when sequentially repressing the plurality of functions, the function controller waits for a preset time each time one function is repressed; and
    the function controller represses a function different from the one function that is repressed after waiting for the preset time.

3. The vehicle wireless communication device according to claim 2, wherein:
    the function controller is configured to repress the plurality of functions in order of the function of transmission of radio waves by the transmission portion, reception of radio waves by the reception portion, and the positioning function by the positioning portion.

4. The vehicle wireless communication device according to claim 1, wherein:
    the function controller is configured to restitute a plurality of functions including the transmission of radio waves by the transmission portion and the reception of radio waves by the reception portion according to the temperature;
    the function controller is configured to sequentially restitute the plurality of functions; when sequentially repressing the plurality of functions, the function controller waits for a preset time each time one function is restituted; and
    the function controller restitutes a function different from the one function that is repressed after waiting for the preset time.

5. The vehicle wireless communication device according to claim 1, wherein:
    the function controller is configured to repress a plurality of functions including the transmission of radio waves by the transmission portion and the reception of radio waves by the reception portion according to the temperature; and
    the vehicle wireless communication device further includes a notification portion configured to provide a notification to an occupant of the vehicle when the plurality of functions are repressed.

6. The vehicle wireless communication device according to claim 1, wherein:
    the function controller is configured to repress a plurality of functions including the transmission of radio waves by the transmission portion and the reception of radio waves by the reception portion according to the temperature;
    when the temperature is equal to or higher than a repression threshold that is preset and also when a change rate of the temperature is positive, the function controller represses the plurality of functions; and
    when the temperature is less than the repression threshold or when the change rate of the temperature is not positive, the function controller does not repress the plurality of functions.

7. The vehicle wireless communication device according to claim 6, wherein:
    when the temperature is less than a restitution threshold that is preset and also when a change rate of the temperature is negative, the function controller restitutes a plurality of repressed functions;

when the temperature is equal to or higher than the restitution threshold or when the change rate of the temperature is not negative, the function controller does not restitute the plurality of repressed functions; and the repression threshold is set to a temperature higher than the restitution threshold.

8. The vehicle wireless communication device according to claim 1, wherein:

the function controller is configured to restitute a plurality of functions including the transmission of radio waves by the transmission portion and the reception of radio waves by the reception portion according to the temperature;

when the temperature is less than a restitution threshold that is preset and also when a change rate of the temperature is negative, the function controller restitutes a plurality of repressed functions; and when the temperature is equal to or higher than the restitution threshold or when the change rate of the temperature is not negative, the function controller does not restitute the plurality of repressed functions.

9. A vehicle wireless communication device that is mounted on a vehicle and is configured to communicate with a device outside of the vehicle, the vehicle wireless communication device comprising:

a sensor configured to acquire a temperature of the vehicle wireless communication device;

one or more processors; and a memory coupled to the one or more processors and storing program instructions that when executed by the one or more processors cause the one or more processors to at least:

transmit radio waves;

receive radio waves;

perform positioning to determine a position of the vehicle based on signals received from a global navigation satellite system (GNSS);

determine whether the temperature of the vehicle wireless communication device is greater than a repression threshold and whether a change rate of the temperature of the vehicle wireless communication device is positive;

in response to determining that the temperature of the vehicle wireless communication device is greater than the repression threshold and that the change rate of the temperature of the vehicle wireless communication device is positive, (1) repress the transmitting of radio waves, or the receiving of radio waves and (2) repress the performing of positioning, and in response to determining that the temperature of the vehicle wireless communication device is not greater than the repression threshold or that the change rate of the temperature of the vehicle wireless communication device is not positive, restitute a repressed function.

* * * * *